Oct. 14, 1924.  1,511,425
E. ROUČKA
AUTOMATIC REGULATOR
Filed March 26, 1921  2 Sheets-Sheet 1
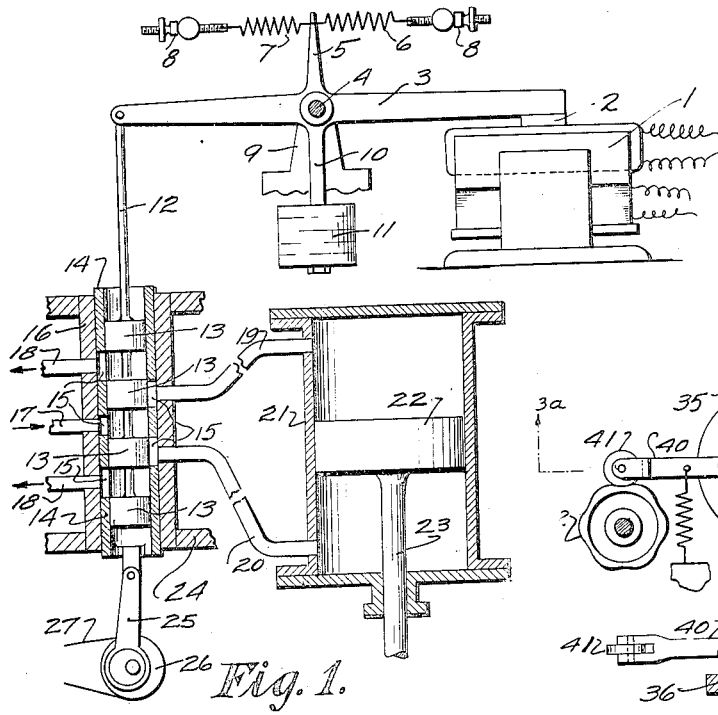
Fig. 1.
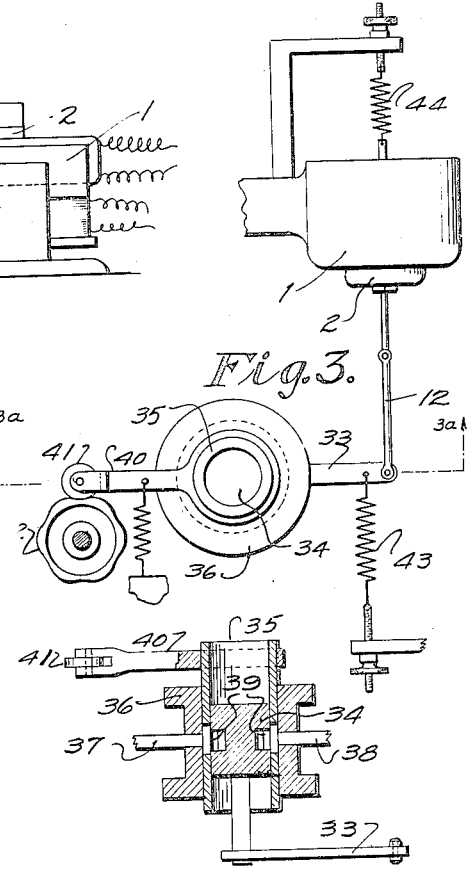
Fig. 3.
Fig. 3a.
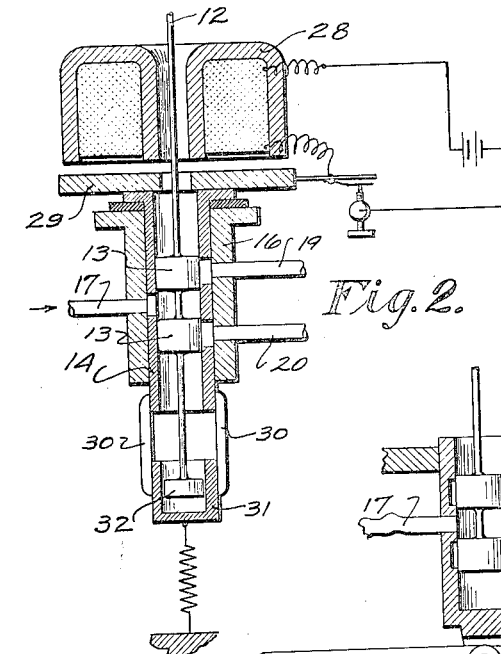
Fig. 2.
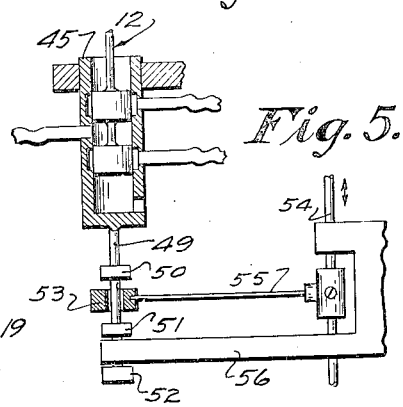
Fig. 5.
Fig. 4.
INVENTOR
ERICH ROUČKA,
BY Everett Rook
ATTORNEYS.

Oct. 14, 1924.  
E. ROUČKA  
1,511,425  
AUTOMATIC REGULATOR  
Filed March 26, 1921  
2 Sheets-Sheet 2

INVENTOR  
ERICH ROUČKA,  
BY  
Everett Rook  
ATTORNEYS.

Patented Oct. 14, 1924.

1,511,425

UNITED STATES PATENT OFFICE.

ERICH ROUČKA, OF EAST ORANGE, NEW JERSEY.

AUTOMATIC REGULATOR.

Application filed March 26, 1921. Serial No. 455,975.

*To all whom it may concern:*

Be it known that I, ERICH ROUČKA, a citizen of the Republic of Czechoslovakia, and a resident of East Orange, in the county of Essex and State of New Jersey, have invented new and useful Improvements in Automatic Regulators, of which the following is a specification.

This invention relates to automatic regulators, and measuring instruments of the balanced or compensating system type and has particular reference to such devices as are adaptable to accurately and sensitively control many types of power systems varying widely in size, one object of the invention being the provision of a regulator by which any quantities or qualities, physical or chemical, of a system can be controlled by means of fluids. Such quantities and qualities may be electric current, voltage, watts consumption or production, and phase angle. These quantities and qualities may relate to generators, boosters, rheostats, and electrical systems in general, the regulation of electric furnace electrodes, pressure of fluids, flow of fluids, speed of motion regulation of prime movers, furnaces and the like.

Another object resides in the provision of means whereby the sensitivity of the controlling element may be very greatly increased beyond what has hitherto been possible.

The regulator is adapted to control the characteristic of the system under control by either keeping it constant in value or permitting it to vary in a predetermined manner. The regulator is adapted to work with a pilot motor, such for example as a piston in a cylinder, a diaphgram, float motor, rotatable motor, etc., although it can regulate without a pilot motor. To control large amounts of power a relay or governor motor may be used in the manner hereinafter described. For preventing hunting of the regulator a yielding return device is provided.

Hitherto regulators involving a movable element, such as a plunger or piston valve, have been objectionable particularly since the movable element has encountered considerable friction between it and the surface with which it contacts in its movement. This friction has required the application of such force to the element, either to start it or to keep it in motion, as has made its action sluggish and has caused it to "overthrow." Moreover, when large amounts of power have had to be controlled directly by the movable element, the sizes of the parts thereof have been such as have required heavy, expensive, and cumbersome apparatus.

My invention aims to overcome these objectionable features of apparatus hitherto used and comprises in general the provision of means whereby the surface with which the above-mentioned movable element is in contact is kept in a state of movement or vibration so that the static and other friction between these two bodies is substantially reduced. This vibration takes place in the direction of movement of the movable element, which results in the application of the invention in the form of simple compact and inexpensive apparatus. In connection with regulators which have to control larger amounts of power, I so apply the invention that the movable element and its cooperating parts do not directly control the power but do so by a "relay" action. By this particular provision I can use small and easily movable parts in my regulator and yet control power in any quantity.

Referring to the accompanying drawings, in which like numerals of reference indicate the same parts throughout the several views, Figure 1 represents a diagram of a simple form of my invention in which the movable element is electrically controlled and the vibration is produced mechanically;

Figure 2 represents a modification in which the vibrations are produced electrically;

Figure 3 represents a modified form in which the motion of the movable element and the surface with which it contacts is a rotary motion;

Figure 6:
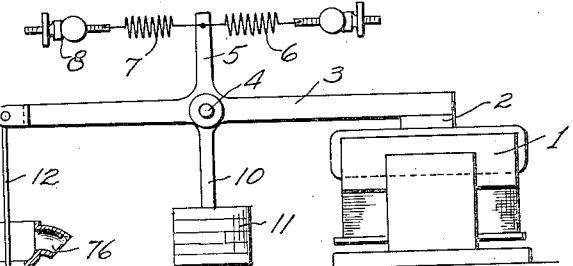
Figure 8:
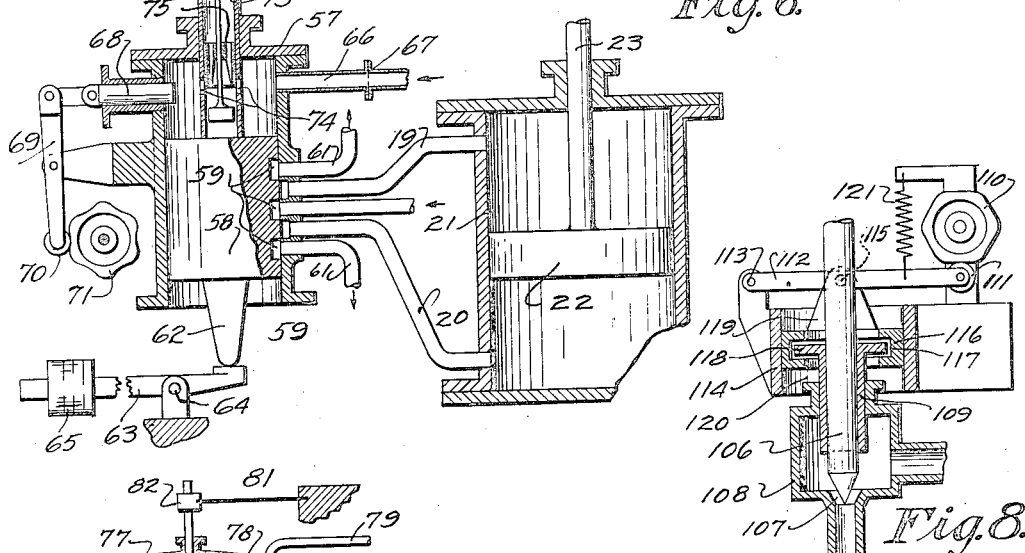
Figure 7:
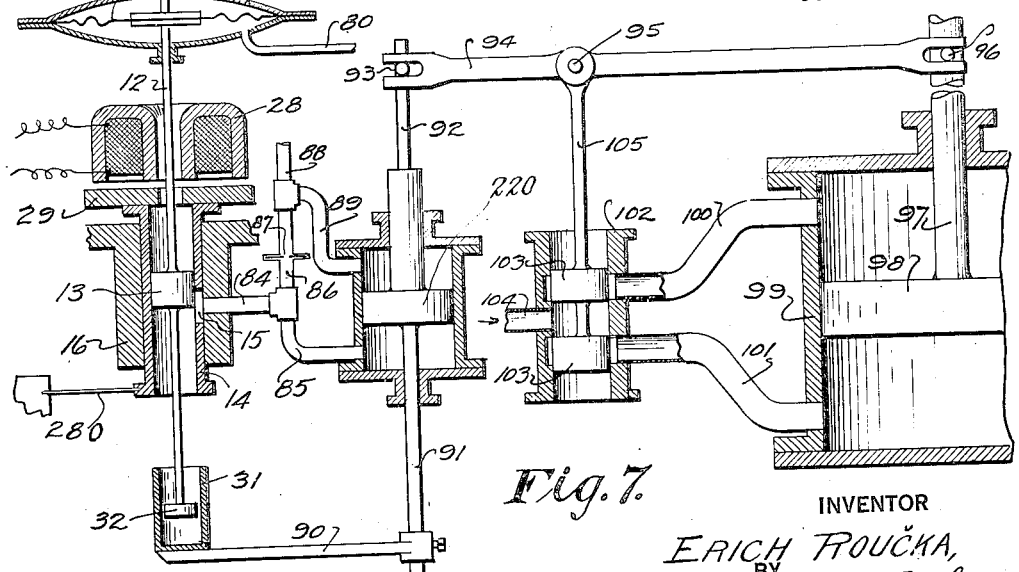

Figure 3ª represents a partial horizontal section taken through plane 3ª—3ª of Fig. 3;

Figure 4 represents a modification in which the receptacle containing the ports for the controlling fluid is itself vibrated;

Figure 5 represents a modification in which a sharp and short vibration similar to a hammer action is produced;

Figure 6 represents a form of my invention in which the movable system indirectly controls larger amounts of power;

Figure 7 represents a similar combination in which the movable element is controlled by fluid action, and Figure 8 represents a modification in which the movable element is a needle valve.

The application of the invention shown in Figure 1 comprises an electro-magnet 1, of any suitable type, adapted to actuate a core 2, or secondary winding, attached to one end of a lever 3, which is pivoted at 4. Opposite the pivot point, the lever 3 is provided with an outwardly extending arm 5, to the end of which the inner ends of springs 6 and 7 are fastened. The tension of these springs is adjusted by any suitable means such as 8. The lever 3 is mounted on a standard 9, and has a depending arm 10 to which a weight 11 is attached, said weight serving to diminish or in part prevent vibration of the valve, due to vibration of the sleeve 14 hereinafter described.

The opposite end of the lever 3 is connected to a rod 12 which in turn is connected to a governing valve element 13. This valve element is adapted to slide within a sleeve 14 which has a plurality of ports 15 therein. This sleeve 14 is adapted to slide within a casing 16, to which, on one side inlet and outlet pipes 17 and 18, respectively are connected. This casing on the other side is connected by pipes 19 and 20 to a cylinder 21 in which a piston 22 and a piston rod 23 are located. The casing is mounted on any suitable platform 24. The lower end of the sleeve 14 is connected to a connecting rod 25 eccentrically mounted on a pulley 26 driven by a belt 27.

In the operation of the device shown in this figure, the electro-magnet 1 is designed so that a normal flow of current therethrough is sufficient to balance the action of springs 6 and 7 to hold the lever 3 in a neutral position. This action is designed to keep the current, voltage, phase, etc., of a system constant or to cause it to vary in a predetermined manner. In this position the valve element 13 is disposed as shown. If the current increases the core 2 is drawn in, raising the outer end of the lever and raising the valve element and uncovering the ports 15 so as to permit the flow of controlling fluid from inlet pipe 17 into pipe 19 to the upper side of piston 22 and from the lower side of piston 22 through pipe 20 out pipe 18 to any suitable container. If the current in the electro-magnet 1 decreases, a reverse movement of the piston is caused whereby the piston 22 is moved in the opposite direction. The rod 23 can be connected to any suitable mechanism such as a rheostat, electrodes of furnaces, boosters, etc., or other device whereby the flow of power or other conditions in the system under control is regulated. During all this time the sleeve 14 has been vibrating at any desired rate of speed so that the friction between it and the valve 13 is substantially reduced. This reduction of the friction permits the valve element to be moved much more easily and smoothly whereby its tendency to surge or overthrow is eliminated. By being thus sensitized, the parts of the regulator can be made much more compact and reduced in size and less power is required of it to perform the desired functions.

In Figure 2 an electric interrupter 28 is adapted to vibrate an armature 29 connected to the sleeve 14. In this modification the bottom of the sleeve is connected by arms 30 to a dash pot 31 which moves with the sleeve and may contain any suitable damping fluid such as oil, glycerine, water, steam, air, etc. A plunger 32 on the lower end of the rod 12 moves in the dash pot. The rod 12 can be operated as previously described.

In Figures 3 and 3ᵃ, the rod 12 is connected to an arm 33 which is connected to a valve element 34, the valve element being rotatable within a sleeve 35 mounted within a stationary casing 36 provided with inlet and outlet pipes 37 and 38 similar to those above mentioned, and cooperating with ports 39 in the piston 34. The controlling movement of the valve is produced through the arm 33 by movement of the rod 12 by the device 1. The sleeve 35 is oscillated by the engagement of an arm 40 and roller 41 with a suitably operated cam 42. The normal position of the arm 33 is maintained by means of springs 43 and 44.

In Figure 4 a modification is shown in which there is no sleeve but in which the casing 45 itself is vibrated by reason of its connection with a pivoted arm 46 actuated through roller 47 by a cam 48.

In Figure 5, the casing 45 is vibrated by reason of its connection with a rod 49 having thereon projections 50, 51 and 52 spaced apart. A hammer block or striker 53 embraces rod 49 and is actuated by shaft 54 through connection 55. The shaft 54 is actuated in any suitable manner to give the desired kind of blow to the block 53 and is mounted in a fixed support 56 one end of which is disposed around the rod 49 between the projections 51 and 52. As the block 53 moves the rod 49 sharply downward the projection 51 hits the support 56 and as the rod 49 is moved sharply around the projection 52 hits the support. The action causes the casing 45 to be given a very sharp vibration.

In the application of the invention shown in Figure 6, the rod 12 is actuated in the manner shown in Figure 1. However, in this modification, a relay action is relied upon to actuate the valve element since the power to be controlled is much larger and to be controlled directly by the movable element as shown in Figure 1 would require too large, expensive, and cumbersome apparatus. Therefore in this form the element 12 controls the flow of fluid to act on a relay valve element which in turn controls the flow of fluid to the main piston 22. A casing 57 is provided in which the relay valve element 58 is disposed and provided with ports 59 connecting with pipes 19, 20 and 61 as shown. A depending arm 62 extends from the valve element 58 and rests on the end of a lever 63 pivoted at 64 and having on the other end a weight 65. The upper end of the casing 57 is provided with a fluid inlet pipe 66 containing a throttling diaphragm 67. A plunger 68 also projects into the casing 57 and is reciprocated or vibrated by a pivoted lever 69 and roller 70 actuated by a cam 71. The fluid pressure in casing 57 holds the roller 70 in engagement with the cam 71.

To the upper end of the valve element 58 a cylindrical sleeve 73 is attached and extends upwardly through the casing 57. This sleeve is provided with ports 74 normally partly closed by the hollow piston 75 on the lower end of rod 12. Assuming a normal flow of liquid through the pipe 66, it will pass into the casing 57 above the piston 58 and through ports 74 up through the hollow piston 75 into sleeve 73, and overflow out a sput 76. If however, the hollow valve element 75 is lowered the ports 74 are closed somewhat and this closure increases the pressure of the fluid in the casing 57 and forces the valve element 58 down against the normal balancing action of the weight 65. The movement of the valve element 58 will cause the main controlling fluid to flow in the pipes 19 and 61 as desired to move the piston 22 in the manner previously described. A reverse movement of the hollow valve element 75 causes a reduction of fluid pressure in the casing 57 whereby the weight 65 moves the valve element 58 upwardly to cause the main controlling fluid to move the piston 22 in the opposite direction. By this action it can be readily observed that the movable element including the rod 12 can be still made small since they do not directly control the main fluid stream. The action of plunger piston 68 causes a pulsation of the fluid in the casing 57 to vibrate the valve element 58 whereby the sleeve 73 is kept in constant motion with respect to the hollow piston 75 for the purpose previously described.

In the application of the invention shown in Figure 7 the movable element 12 is actuated by a diaphragm 77 within a fluid chamber 78 into which fluid from pipes 79 and 80 may flow to move the diaphragm in one direction or another. The normal position of the rod 12 is maintained by spring 81 connected to a collar 82 on the rod 12. The valve element 13 controls the opening in port 15 in sleeve 14 sliding within casing 16. The sleeve is actuated by connection with an armature 29 vibrated by an alternating current magnet 28, acting against the force of a spring 280 connected to the bottom of sleeve 14 which constantly influences the sleeve 14 into its proper position relatively to the port 84. The port 15 connects to pipe 84. The pipe 84 connects with one side of piston 220 by pipe 85 and by pipe 86 with a throttle diaphragm 87 and an inlet pipe 88. On one side of the throttle diaphragm 87 the inlet pipe 88 also connects by pipe 89 with the upper and other side of piston 22. The lower end of element 12 is connected to a plunger 32 moving within a dash pot 31. The dash pot is connected by arm 90 with the lower end of rod 91 connected to piston 220. The other side of piston 220 is connected to rod 92 which has a connection by pin 93 with one end of lever 94 pivoted at 95. The other end of lever 94 engages a pin 96 on the upper end of piston rod 97 connected to piston 98 disposed in main power cylinder 99. This cylinder has pipes 100 and 101 connecting to opposite sides thereof. These pipes lead to an auxiliary cylinder 102 in which a pair of spaced pistons 103 are disposed. These pistons normally close the ends of pipes 100 and 101. An inlet pipe 104 is connected to the cylinder 102 between the pistons 103. These pistons are connected to a rod 105 connected to lever 94 at 95.

In the operation of this modification, the action of diaphragm 77 moves the rod 12 down. This reduces the opening through port 15. This tends to let less liquid through and causes a back pressure in the pipe 84 which increases the pressure against the lower side of the piston 220. Normally the flow of fluid in these pipes and through the diaphragm 87 is so arranged that for the position of the valve element 13 shown the piston 220 does not move because the pressures on opposite sides thereof are balanced. This unbalancing of the pressure causes the piston 220 to move upwardly and raise the lever 95 around the pipe 96 as a fulcrum. By moving lever 94 up the pistons 103 are raised causing the main control fluid to flow into pipe 100 and move the piston 98 downwardly. As soon as this downward movement of the piston 98 commences the lever 94 is then moved around the pin 93 as a fulcrum causing the return of the pistons 103 to normal position.

As the valve element 13 moves downwardly as above described the plunger 32 moves against the liquid cushion in the dash pot 31. This dash pot has commenced to move upwardly, however, due to its connection with the piston rod 91 and this differential action prevents the valve element 13 from overflowing in either direction. If the valve element 13 had been moved upwardly the opening 15 would have reduced the pressure under the piston 22 whereby it would move downwardly and this movement would carry dash pot 31 with it which would tend to bring back the plunger 32 and the valve element 13, thus preventing overthrow in the opposite direction. When the conditions of normal power are restored in the system under control by the action of piston 98, the fluid pressure difference of pipes 79 and 80 will bring the valve 13 back to normal position shown in Figure 7 and stopping the piston 22 wherever it happens to be.

The dash pot 31 moves with the piston 32 and aids in restoring the governor valve 13 to normal position more quickly and thus prevents hunting of the regulator. This action of the dash pot is effective in the valve 13 with respect to movement of the valve in both directions. Thus it is understood that by character of regulation is meant the speed and direction of movement of the regulation. By this means a very small and delicate regulator device can control the movement of mechanism many times more powerful and cumbersome.

In Figure 8, the movable element is a needle valve 106 adapted to close a port 107 in a casing 108. A sleeve 109 surrounds the needle valve and is actuated by means of a cam 110. This cam actuates a roller 111 on a lever 112 pivoted at 113 on a stationary support 114 and connected at 114 to an annular ring member 116 having an inner groove 117 in which is arranged a flange 118 on the sleeve 109. The ring 116 is connected by a flange 119 with the lever 112, and slides within the bore 120 of the support 114. A spring 121 holds the lever 112 and roller 111 against the cam 110. The element or needle valve 106 may be actuated by any of the means previously described.

This type of regulator is not limited in its application to the type of motor shown in the figures but is equally applicable to fluid motors with diaphragms or rotatable fluid motors, etc., or without any motor when for instance any pressure or flow of fluid shall be regulated.

Having thus described the invention, what I claim is:

1. A system of the character described comprising a movable valve element, a surface along which the element is adapted to slide, means for controlling the movement of said valve element, and means for continuously vibrating said surface independently of the movement of said valve element but in the direction of movement of said valve element to reduce the friction therebetween.

2. A system of the character described comprising a movable valve element, means for moving said element in response to variations in the system under control, a valve casing within which said element is adapted to slide, a sleeve valve disposed between the casing and the movable element, and means for continuously vibrating the sleeve independently of the movement of the element but in the direction of movement thereof to reduce the friction therebetween.

3. A system of the character described comprising a fluid motor, a valve element movable in response to variations in the system under control and adapted to regulate the admission of fluid to said motor, a surface along which the valve element is adapted to slide, and means for continuously vibrating said surface independently of the movement of the valve element but in the direction of movement thereof to reduce the friction therebetween.

4. A system of the character described comprising a fluid motor, a valve element movable in response to variations in the system under control and adapted to regulate the admission of fluid to said motor, a casing within which said element is adapted to slide, a sleeve valve disposed between the casing and the movable valve element, and means for continuously vibrating the sleeve independently of the movement of the valve element but in the direction of movement thereof to reduce the friction therebetween.

5. A system of the character described comprising a fluid motor, a governor adapted to control the flow of fluid to said motor, a valve element movable in response to variations in the system under control and adapted to regulate the governor, a surface along which the valve element is adapted to slide, and means for continuously vibrating said surface independently of the movement of said valve element but in the direction of movement thereof to reduce the friction therebetween.

6. A system of the character described comprising a movable valve element, means for moving said element in response to variations in the system under control, a surface along which the element is adapted to slide, means for continuously vibrating said surface independently of the movement of said valve element but in the direction of the movement thereof to reduce the friction therebetween, and means to prevent hunting or overthrowing of the regulator.

7. A system of the character described comprising a fluid motor, a valve element movable in response to variations in the system under control and adapted to regulate the admission of fluid to said motor, a surface along which the valve element is adapted to slide, means for continuously vibrating said surface independently of but in the direction of the movement of said valve element to reduce the friction therebetween, and means for preventing overthrowing or hunting of the regulator.

8. A system of the character described comprising a fluid motor, a governor adapted to control the flow of fluid to said motor, a valve element movable in response to variations in the system under control and adapted to regulate the governor, a surface along which the valve element is adapted to slide, means for continuously vibrating said surface independently of the movement of said element but in the direction of movement thereof to reduce the friction therebetween, and means to prevent hunting or overthrowing of the regulator system.

9. A system of the character described comprising a fluid motor, a governor adapted to control the flow of fluid to said motor, a valve element movable in response to variations in the system under control and adapted to regulate the governor, a casing within which said element is adapted to slide, a sleeve valve disposed between the casing and the movable element, means for continuously vibrating the sleeve independently of the movement of the element but in direction of the movement thereof to reduce the friction therebetween, and means to prevent hunting or overthrowing of the system.

10. A system of the character described comprising a movable valve element, a surface along which the element is adapted to slide, means for controlling the movement of said valve element, and electrical vibrating means for continuously vibrating said surface independently of the movement of said valve element but in the direction of movement of said valve element to reduce the friction therebetween.

11. A system of the character described comprising a movable valve element, means for moving said element in response to variations in the system under control, a valve casing within which said element is adapted to slide, a sleeve valve disposed between the casing and the movable element, and an electric vibrator having the movable part thereof connected to said sleeve for continuously vibrating the sleeve independently of the movement of the element but in the direction of movement thereof to reduce the friction therebetween.

12. A system of the character described comprising a movable valve element, means for moving said element in response to variations in the system under control, a valve casing within which said element is adapted to slide, a sleeve valve disposed between the casing and the movable element, means for continuously vibrating the sleeve independently of the movement of the element but in the direction of movement thereof to reduce the friction therebetween, and yielding means for constantly influencing said sleeve into its proper position.

ERICH ROUČKA.